United States Patent
Inoue et al.

(10) Patent No.: US 10,203,071 B2
(45) Date of Patent: Feb. 12, 2019

(54) REFLECTION TYPE FLUORESCENCE LIGHT SOURCE APPARATUS

(71) Applicant: Ushio Denki Kabushiki Kaisha, Tokyo (JP)

(72) Inventors: Masaki Inoue, Tokyo (JP); Seiji Kitamura, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/561,550

(22) PCT Filed: Feb. 23, 2016

(86) PCT No.: PCT/JP2016/055162
§ 371 (c)(1),
(2) Date: Sep. 26, 2017

(87) PCT Pub. No.: WO2016/158088
PCT Pub. Date: Oct. 6, 2016

(65) Prior Publication Data
US 2018/0080615 A1    Mar. 22, 2018

(30) Foreign Application Priority Data

Mar. 31, 2015  (JP) .................................. 2015-071276

(51) Int. Cl.
*F21K 9/64*    (2016.01)
*F21V 7/22*    (2018.01)
(Continued)

(52) U.S. Cl.
CPC ................ *F21K 9/64* (2016.08); *C09K 11/00* (2013.01); *F21V 7/22* (2013.01); *G02B 1/118* (2013.01);
(Continued)

(58) Field of Classification Search
CPC ... F21K 9/64; F21V 29/70; F21V 7/22; F21V 29/502; F21V 9/30; F21Y 2115/30; C09K 11/00; G02B 1/118; G02B 5/08
(Continued)

(56) References Cited

U.S. PATENT DOCUMENTS

| 2004/0046497 A1* | 3/2004 | Schaepkens | B82Y 20/00 |
| | | | 313/506 |
| 2005/0139783 A1* | 6/2005 | Kubota | G03B 42/08 |
| | | | 250/484.4 |
| 2013/0334956 A1 | 12/2013 | Bretschneider | |

FOREIGN PATENT DOCUMENTS

| JP | 2003-279654 A | 10/2003 |
| JP | 2011-129354 A | 6/2011 |

(Continued)

OTHER PUBLICATIONS

International Search Report issued in PCT/JP2016/055162; dated May 24, 2016.
(Continued)

*Primary Examiner* — Elmito Breval
*Assistant Examiner* — Hana S Featherly
(74) *Attorney, Agent, or Firm* — Studebaker & Brackett PC

(57) ABSTRACT

The present invention has as its object the provision of a fluorescence light source apparatus that is prevented from a drop in reflectance and can provide high emission efficiency over a long period of time without causing the problem of exfoliation of a reflection layer from a fluorescent plate. The fluorescence light source apparatus according to the present invention includes a fluorescent plate that is made of a phosphor for emitting fluorescence under excitation light and a metal oxide and has a front surface serving as an excitation light incident surface, a reflection layer disposed on a back surface side of the fluorescent layer, and a heat
(Continued)

dissipation substrate. A sealing layer covering the back surface and a peripheral side surface of the reflection layer is provided in close contact with a peripheral area of the back surface of the fluorescent plate via an adhesion layer.

3 Claims, 2 Drawing Sheets

(51) Int. Cl.
| | |
|---|---|
| *G02B 5/08* | (2006.01) |
| *C09K 11/00* | (2006.01) |
| *G02B 1/118* | (2015.01) |
| *F21V 29/502* | (2015.01) |
| *F21V 9/30* | (2018.01) |
| *F21V 29/70* | (2015.01) |
| *F21Y 115/30* | (2016.01) |

(52) U.S. Cl.
CPC ................ *G02B 5/08* (2013.01); *F21V 9/30* (2018.02); *F21V 29/502* (2015.01); *F21V 29/70* (2015.01); *F21Y 2115/30* (2016.08)

(58) Field of Classification Search
USPC ........................................................... 362/84
See application file for complete search history.

(56) References Cited

FOREIGN PATENT DOCUMENTS

| | | |
|---|---|---|
| JP | 2014-179231 A | 9/2014 |
| JP | 2014-192127 A | 10/2014 |
| JP | 2014-194895 A | 10/2014 |
| WO | 2014/065051 A1 | 5/2014 |

OTHER PUBLICATIONS

An Office Action; "Decision to Grant a Patent," issued by the Japanese Patent Office dated Jan. 17, 2017, which corresponds to Japanese Patent Application No. 2015-071276.

\* cited by examiner

REFLECTION TYPE FLUORESCENCE LIGHT SOURCE APPARATUS

TECHNICAL FIELD

The present invention relates to a fluorescence light source apparatus.

BACKGROUND ART

Fluorescence light source apparatuses configured to irradiate a fluorescent plate with laser light as excitation light and emit fluorescence from a phosphor constituting the fluorescent plate have been conventionally known.

As illustrated in FIGS. 3 and 4, some type of fluorescence light source apparatus includes a fluorescent plate 51 that contains a phosphor for emitting fluorescence under excitation light from an excitation light source 11 such as a semiconductor laser and has a front surface (in FIG. 3, top surface) serving as an excitation light incident surface, and a heat dissipation substrate 52 that is disposed on a back surface (in FIG. 3, bottom surface) side of the fluorescent plate 51 (for example, see Patent Literature 1). In the fluorescence light source apparatus, the back surface of the fluorescent plate 51 is provided with a reflection layer and the like, and thus has a reflection function. The reflection layer may preferably be made of a metal having a high light reflection characteristic. Aluminum (Al), silver (Ag) and the like are used as the metal constituting the reflection layer. A bonding member layer 53 made of a metal such as a solder is interposed between the reflection layer provided on the fluorescent plate 51 and the heat dissipation substrate 52. The fluorescent plate 51 is bonded onto the heat dissipation substrate 52 by the bonding member layer 53.

CITATION LIST

Patent Literature

Patent Literature 1: Japanese Patent Application Laid-Open No. 2011-129354

SUMMARY OF INVENTION

Technical Problem

However, the fluorescence light source apparatus including the reflection layer provided on the fluorescent plate causes a problem that the reflection layer exfoliates from the fluorescent plate due to weak adhesion of the reflection layer, and the reflectance of the reflection layer drops due to surface deterioration by oxidation, sulfuration and the like.

The exfoliation of the reflection layer from the fluorescent plate occurs particularly when the reflection layer is made of silver (Ag) or a silver alloy consisting mainly of silver (Ag).

The present invention has been made in view of the foregoing circumstances and has as its object the provision of a fluorescence light source apparatus that is prevented from a drop in reflectance and can provide high emission efficiency over a long period of time without causing the problem of exfoliation of the reflection layer from the fluorescent plate.

Solution to Problem

A fluorescence light source apparatus according to the present invention is a fluorescence light source apparatus including a fluorescent plate that is made of a phosphor for emitting fluorescence under excitation light and a metal oxide and has a front surface serving as an excitation light incident surface, a reflection stack that includes a reflection layer disposed on a back surface side of the fluorescent plate, and a heat dissipation substrate, wherein a sealing structure of the reflection stack is formed by the fluorescent plate, a sealing layer covering a back surface and a peripheral side surface of the reflection layer, and an adhesion layer that bonds the sealing layer to the reflection stack and the fluorescent plate.

In the fluorescence light source apparatus according to the present invention, the reflection layer may preferably be made of a silver reflection film formed on the back surface side of the fluorescent plate via a metal oxide multilayer film.

Advantageous Effects of Invention

According to the fluorescence light source apparatus of the present invention, the sealing layer covering the back surface and the peripheral side surface of the reflection layer is provided in close contact with a peripheral area of the back surface of the fluorescent plate made of the phosphor and the metal oxide via the adhesion layer, whereby the sealing structure of the reflection layer is formed. The reflection layer can thus be brought into close contact with the fluorescent plate, on the back surface side of the fluorescent plate, via other component layers provided according to need. Since the reflection layer is not exposed to the ambient atmosphere such as the air, a drop in the reflectance of the reflection layer due to surface deterioration by oxidation, sulfuration and the like can be prevented.

According to the fluorescence light source apparatus of the present invention, a drop in reflectance can be prevented and high emission efficiency can be obtained over a long period of time without causing the problem of exfoliation of the reflection layer from the fluorescent plate.

DESCRIPTION OF EMBODIMENTS

An embodiment of a fluorescence light source apparatus according to the present invention will be described below.

Figure 1:
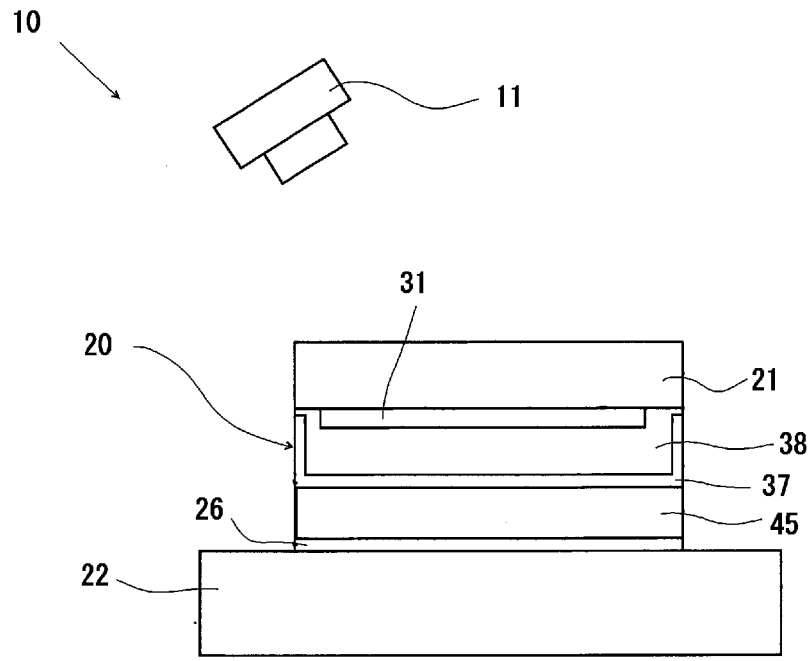
FIG. 1 is an explanatory diagram illustrating an outline of an example of a configuration of a fluorescence light source apparatus according to the present invention.
Figure 2:
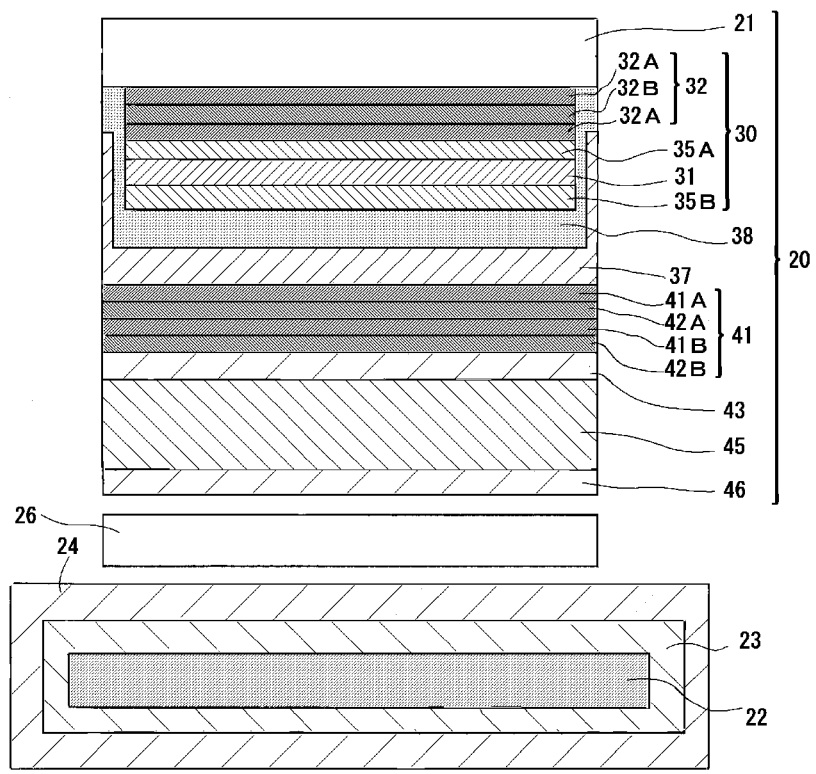
FIG. 2 is an explanatory exploded view illustrating a specific configuration of a fluorescence emission member and a heat dissipation substrate in the fluorescence light source apparatus of FIG. 1.
Figure 3:
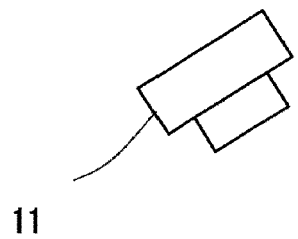
FIG. 3 is an explanatory diagram illustrating an outline of an example of a configuration of a conventional fluorescence light source apparatus.
Figure 3:
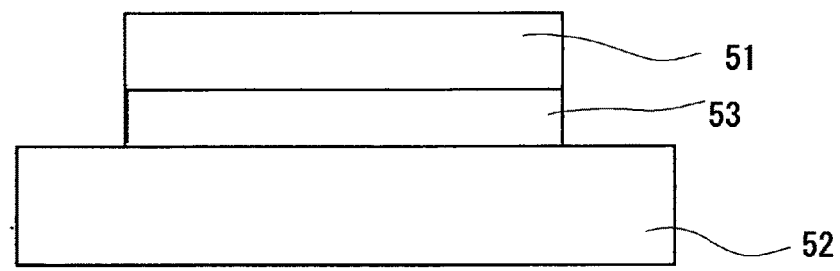
Figure 4:
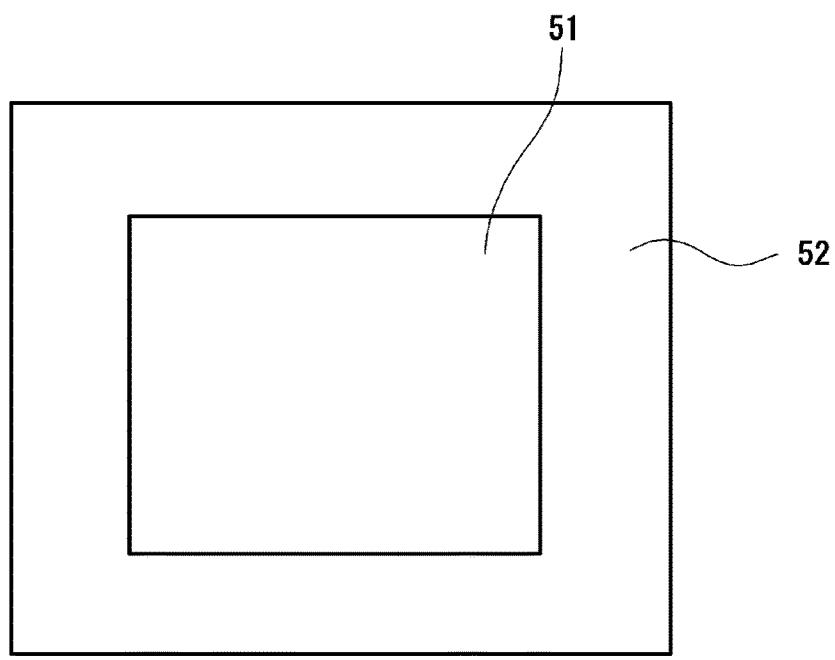
FIG. 4 is an explanatory plan view illustrating a fluorescent plate and a heat dissipation substrate in the fluorescence light source apparatus of FIG. 3.

FIG. 1 is an explanatory diagram illustrating an outline of an example of a configuration of the fluorescence light source apparatus according to the present invention. FIG. 2 is an explanatory exploded view illustrating a specific configuration of a fluorescence emission member and a heat dissipation substrate in the fluorescence light source apparatus of FIG. 1.

As illustrated in FIG. 11, the fluorescence light source apparatus 10 includes an excitation light source 11 which includes a semiconductor laser, for example, and a fluorescence emission member 20 which includes a fluorescent plate 21 containing a phosphor for emitting fluorescence when excited by excitation light emitted from the excitation light source 11. The excitation light source 11 and the fluorescence emission member 20 are arranged at a distance from each other. The fluorescence light source apparatus 10 also includes a heat dissipation substrate 22.

In the illustrated example, the fluorescence emission member 20 is opposed to the excitation light source 11 in an orientation oblique to an optical axis of the excitation light source 11.

The fluorescence emission member 20 is configured so that a front surface (in FIGS. 1 and 2, top surface) of the fluorescent plate 21 of flat plate shape serves as an excitation light incident surface and a fluorescence emission surface.

The fluorescence emission member 20 is configured so that a back surface (in FIGS. 1 and 2, bottom surface) of the fluorescent plate 21 is opposed to and bonded to a front surface (in FIGS. 1 and 2, top surface) of the heat dissipation substrate 22 of flat plate shape. A bonding member layer 26 of flat plate shape is formed between the heat dissipation substrate 22 and the fluorescence emission member 20. In other words, the fluorescence emission member 20 and the heat dissipation substrate 22 are bonded by the bonding member layer 26.

The fluorescence emission member 20 is disposed so that the front surface of the fluorescent plate 21 is opposed to the excitation light source 11.

The fluorescent plate 21 is a plate-like member including the phosphor and a metal oxide, and more specifically, a sintered body of a mixture of the phosphor and the metal oxide. The fluorescent plate 21 is a plate-like member in which portions made of metal oxide particles (hereinafter, also referred to as "metal oxide portions") are mixed with portions made of phosphor particles (hereinafter, also referred to as "phosphor portions"), and from the front surface of which metal oxide portions are exposed.

Since the fluorescent plate 21 includes the phosphor and the metal oxide, i.e., includes metal oxide portions and phosphor portions, and metal oxide portions are exposed from the front surface, high adhesion to the constituent members of the fluorescence emission member 20 (in the illustrated example, a reflection stack 30 and an adhesion layer 38 to be described later) stacked in contact with the fluorescent plate 21 is provided.

Since the fluorescent plate 21 includes the phosphor and the metal oxide, the excitation light entering the inside of the fluorescent plate 21 and fluorescence are guided in a controlled manner. This reduces an emission area in the fluorescence emission surface and improves emission luminance. Inside the fluorescent plate 21, the traveling direction of excitation light that is incident on and not absorbed by a phosphor portion is changed by the interface between the phosphor portion and a metal oxide portion. Part of the excitation light that is incident on and not absorbed by the phosphor portion thus travels toward another phosphor portion. This increases the optical path length for converting the excitation light into fluorescence, and the probability for the excitation light to be absorbed into a phosphor portion increases. As a result, the excitation light entering the inside of the fluorescent plate 21 can be effectively used and converted into fluorescence with high efficiency. In addition, the traveling direction of fluorescence emitted from a phosphor portion is changed by interfaces between other phosphor portions and metal oxide portions. This suppresses confinement of fluorescence within the fluorescent plate 21. As a result, the fluorescence emission member 20 can effectively use fluorescence occurring in the fluorescent plate 21 and emit the fluorescence to outside with high efficiency.

A polycrystalline phosphor is used as the phosphor of the fluorescent plate 21.

Since the phosphor constituting the fluorescent plate 21 is a polycrystalline phosphor, the fluorescent plate 21 has high thermal conductivity. Heat occurring in the fluorescent plate 21 due to the irradiation with the excitation light is thus efficiently dissipated, whereby high temperature of the fluorescent plate 21 is suppressed. In the fluorescence emission member 20, a decrease in the light amount of fluorescence due to the occurrence of temperature quenching in the phosphor can thus be suppressed.

Here, the polycrystalline phosphor constituting the fluorescent plate 21 can be obtained, for example, in the following manner. Initially, raw materials such as a base material, an activator, a metal oxide and a baking auxiliary are ground in a ball mill or the like to obtain submicron or smaller, raw material fine particles. Next, a molded article of the raw material fine particles is formed by slip casting, for example, followed by sintering. The sintered article is then subjected to hot isotropic pressing to obtain a polycrystalline phosphor having a porosity of lower than or equal to 0.5%, for example.

The phosphor constituting the fluorescent plate 21 may preferably be an inorganic phosphor, and more specifically, one made of a complex oxide doped with a rare earth element as a light emission ion (activator).

For example, the fluorescent plate 21 has a phosphor content of 20% to 80% by mass.

For example, the phosphor particles have a particle size (average particle size) of 1 to 10 μm.

From the viewpoint of a heat dissipation property (heat conductivity), adhesion to the phosphor, etc., aluminum oxide ($Al_2O_3$) or the like is used as the metal oxide of the fluorescent plate 21.

The fluorescent plate 21 having such a configuration can be manufactured, for example, by mixing phosphor particles having an appropriate particle size with aluminum oxide ($Al_2O_3$) particles, pressing the mixture, and then baking the same.

Specific examples of the materials of the fluorescent plate 21 may include $Al_2O_3$/YAG:Ce, $Al_2O_3$/YAG:Pr, $Al_2O_3$/YAG:Sm and $Al_2O_3$/LuAG:Ce. The doping amounts of the rare earth elements (activators) in such phosphors of the fluorescent plate 21 are approximately 0.5% by mol.

From the viewpoint of the conversion efficiency (quantum yield) of the excitation light to fluorescence and the heat dissipation property, the fluorescent plate 21 may preferably have a thickness of 0.05 to 2.0 mm.

The fluorescent plate 21 may contain a light scatterer that diffuses at least the excitation light, and may have a light diffusion function for diffusing the excitation light. If the light scatterer diffuses the excitation light and fluorescence, the fluorescent plate 21 has a light diffusion function for diffusing the excitation light and fluorescence.

If the fluorescent plate 21 has a light diffusion function, the traveling direction of the excitation light is changed by the light scatterer inside the fluorescent plate 21. This increases the optical path length for converting the excitation light into fluorescence, and the probability for the excitation light to be absorbed into phosphor portions increases. As a result, the excitation light entering the inside of the fluorescent plate 21 can be effectively used and converted into fluorescence with high efficiency.

If the fluorescent plate 21 has the function of diffusing fluorescence, the traveling direction of fluorescence is changed by the light scatterer inside the fluorescent plate 21. This suppresses the confinement of the fluorescence within the fluorescent plate 21. As a result, the fluorescence emission member 20 can effectively use the fluorescence occurring in the fluorescent plate 21 and emit the fluorescence to outside with high efficiency.

In addition, since the fluorescent plate 21 has the light diffusion function, the thickness of the fluorescent plate 21 can be reduced without the detriment of lowering the conversion efficiency (quantum yield) of the excitation light into fluorescence. If the thickness of the fluorescent plate 21 is reduced, the fluorescent plate 21 has an extremely high heat dissipation property. In addition, emission of the fluorescence from the outer periphery of the fluorescent plate 21 to outside can be sufficiently suppressed or prevented.

The light scatterer contained in the fluorescent plate 21 includes fine particles or a separated phase of grain boundary having a refractive index different from that of aluminum oxide ($Al_2O_3$) constituting the metal oxide portions of the fluorescent plate 21 or that of the phosphor. Examples of the fine particles constituting the light scatterer may include fine particles of inorganic compounds such as yttria, silicon nitride, aluminum nitride and strontium fluoride.

From the viewpoint of the heat dissipation property and a low stress property, a tin-containing solder may preferably be used as a bonding member constituting the bonding member layer 26.

Specific examples of the tin-containing solder used as the bonding member may include a gold-tin alloy (AuSn, a tin (Sn) content of 20% by mass, a thermal conductivity of 250 W/m·K) and a tin-silver-copper alloy (Sn-3Ag-0.5Cu (a silver (Ag) content of 3% by mass, a copper (Cu) content of 0.5% by mass, and a tin (Sn) content of 96.5% by mass), a thermal conductivity of 55 W/m·K). Of these, the gold-tin alloy may preferably be used because of the high thermal conductivity and the low tin content. Specifically, if the gold-tin alloy is used as the bonding member, the high thermal conductivity allows a reduction of approximately 20 degrees in the temperature of the fluorescent plate 21 for the same excitation power of excitation light, compared to a case where the tin-silver-copper alloy is used as the bonding member. The low tin content can suppress a drop in the reflectance of a reflection layer 31.

For example, the bonding member layer 26 has a thickness of 30 μm.

In the illustrated example, the fluorescence emission member 20 and the heat dissipation substrate 22 are bonded with the bonding member by using a reflow method. For example, using a reflow furnace, a flux-free solder sheet (bonding member) sandwiched between the fluorescence emission member 20 and the heat dissipation substrate 22 is heated in a formic acid gas atmosphere or hydrogen gas atmosphere. According to such a bonding method of performing reflowing by using reduction power of the formic acid or hydrogen to remove a surface oxide film of the flux-free solder sheet, voids will not occur in the formed bonding member layer 26 and favorable thermal conductivity is obtained.

The heat dissipation substrate 22 dissipates heat occurring in the fluorescence emission member 20 (specifically, the fluorescent plate 21).

The heat dissipation substrate 22 may preferably be made of a material that has high thermal conductivity and between which and the fluorescent plate 21 a difference in the coefficient of thermal expansion is small.

Specifically, the constituent material of the heat dissipation substrate 22 may preferably have a coefficient of thermal expansion higher than or equal to that of the constituent material of the fluorescent plate 21. The difference in the coefficient of thermal expansion may preferably be smaller than or equal to $9 \times 10^{-6}$ [1/K].

Suppose that the difference in the coefficient of thermal expansion between the constituent material of the heat dissipation substrate 22 and that of the fluorescent plate 21 is smaller than or equal to $9 \times 10^{-6}$ [1/K]. If the operating temperature of the fluorescent plate 21 is set to or below 150° C., the bonding temperature of the bonding member (specifically, tin-containing solder) between the fluorescence emission member 20 and the heat dissipation substrate 22 in the manufacturing steps of the fluorescence light source apparatus 10 is approximately 100° C. When the fluorescence light source apparatus 10 is in operation, compressive stress occurs in the fluorescent plate 21. In such a case, exfoliation due to thermal expansion therefore will not occur between the fluorescent plate 21 and the heat dissipation substrate 22.

Metals such as copper (Cu) and a molybdenum-copper alloy (Mo—Cu) may be used as the constituent material of the heat dissipation substrate 22.

Copper used as the constituent material of the heat dissipation substrate 22 has a coefficient of thermal expansion of $16.5 \times 10^{-6}$ [1/K]. The molybdenum-copper alloy (a copper (Cu) content of 30% by mass) has a coefficient of thermal expansion of $8.6 \times 10^{-6}$ [1/K]. YAG used as the constituent material of the fluorescent plate 21 has a coefficient of thermal expansion of $8.6 \times 10^{-6}$ [1/K].

In the illustrated example, the heat dissipation substrate 22 is made of copper.

The thickness of the heat dissipation substrate 22 may be determined as appropriate in consideration of the heat radiation characteristic. Examples include 0.5 to 5.0 mm.

From the viewpoint of the heat dissipation property, etc., as illustrated in FIGS. 1 and 2, the front surface of the heat dissipation substrate 22 may preferably have an area greater than that of the back surface of the fluorescent plate 21.

The heat dissipation substrate 22 may also have a function of heat dissipation fins.

In the illustrated example, the heat dissipation substrate 22 has a thickness of 2 mm.

From the viewpoint of bondability to the bonding member layer 26, as illustrated in FIG. 2, a metal film formed by stacking a protective film layer 23 and a solder wet film layer 24 in such order may preferably be formed on the front surface (in FIG. 2, top surface) of the heat dissipation substrate 22.

The protective film layer 23 of the metal film is a nickel (Ni) film formed by plating in a Watts bath, for example. The solder wet film layer 24 is a gold (Au) film formed by plating in a Watts bath, for example.

In the illustrated example, the entire outer surfaces (front surface, back surface and peripheral side surfaces) of the heat dissipation substrate 22 are covered with the metal film including the protective film layer 23 and the solder wet film layer 24. As for the thicknesses of the layers constituting the metal film, the protective film layer 23 has a thickness of 2.5 μm. The solder wet film layer 24 has a thickness of 0.03 μm.

The reflection layer 31 of flat plate shape, made of a silver reflection film, is provided on the back surface side of the fluorescent plate 21, or more specifically, between the fluorescent plate 21 and the heat dissipation substrate 22 so as to extend along the back surface of the fluorescent plate 21. In other words, the reflection layer 31 is opposed to the back surface of the fluorescent plate 21. The provision of the silver reflection layer 31 having a high reflection characteristic on the back surface side gives the fluorescent plate 21 a high reflection function on the back side.

For example, the reflection layer 31 has a thickness of 110 to 350 nm.

From the viewpoint of effective use of the excitation light and fluorescence, the front surface (in FIGS. 1 and 2, top surface) of the reflection layer 31 may preferably have an area smaller than or equal to that of the back surface of the fluorescent plate 21.

In the illustrated example, the front surface of the reflection layer 31 has dimensions slightly smaller than those of the back surface of the fluorescent plate 21. The entire front surface of the reflection layer 31 is opposed to a center portion of the back surface of the fluorescent plate 21.

An enhanced reflection portion 32 made of a metal oxide multilayer film is provided between the reflection layer 31 and the fluorescent plate 21, in close contact with the back surface of the fluorescent plate 21. In other words, the enhanced reflection portion 32 and the reflection layer 31 are provided in such order on the back surface of the fluorescent plate 21.

The provision of the enhanced reflection portion 32 made of a metal oxide multilayer film gives the back surface of the fluorescent plate 21 a superior high reflection function.

In the illustrated example, the metal oxide multilayer film constituting the enhanced reflection portion 32 includes silicon dioxide ($SiO_2$) layers 32A and a titanium oxide ($TiO_2$) layer 32B. Here, the metal oxide multilayer film constituting the enhanced reflection portion 32 has a thickness of 350 nm. A reflection stack 30 including the silicon dioxide layers 32A and the titanium oxide layer 32B constituting the enhanced reflection portion 32 is produced by electron beam evaporation. Specifically, stacked films (reflection stack 30) are deposited by electron beam evaporation on the back surface of the fluorescent plate 21 on which a resist patterned by exposure has been disposed. The resist is then lifted off to produce the reflection stack 30. The entire front surface (in FIG. 2, top surface) of the enhanced reflection portion 32 is opposed to and put in contact with the center portion of the back surface of the fluorescent plate 21.

An adhesion improvement layer 35A is provided on the front surface of the reflection layer 31, in close contact with the front surface so that the entire front surface is covered. An adhesion improvement layer 35B is provided on the back surface (in FIG. 2, bottom surface) of the reflection layer 31, in close contact with the back surface so that the entire back surface is covered.

Since the adhesion improvement layers 35A and 35B are provided on the front and back surfaces of the reflection layer 31, respectively, high adhesion is obtained between the reflection layer 31 and the constituent members of the fluorescence emission member 20 stacked on the reflection layer 31 via the adhesion improvement layers 35A and 35B.

In the illustrated example, the enhanced reflection portion 32 is arranged in close contact with the top surface (in FIG. 2, top surface) of the adhesion improvement layer 35A. In other words, the enhanced reflection portion 32 lies between the adhesion improvement layer 35A and the fluorescent plate 21, in close contact with each of the adhesion improvement layer 35A and the fluorescent plate 21. The reflection layer 31, the adhesion improvement layers 35A and 35B and the enhanced reflection portion 32 constitute the reflection stack 30.

The adhesion improvement layers 35A and 35B are made of aluminum oxide ($Al_2O_3$).

The adhesion improvement layers 35A and 35B may preferably have a thickness smaller than or equal to 1 μm.

If the thickness of the adhesion improvement layers 35A and 35B exceeds 1 μm, the adhesion improvement layers 35A and 35B have low thermal conductivity, so that the fluorescent plate 21 rises in temperature when the fluorescence light source apparatus 10 is in operation. As a result, a sufficient amount of fluorescence fails to be obtained due to the occurrence of temperature quenching in the phosphor.

In the illustrated example, the adhesion improvement layer 35A has a thickness of 50 nm. The adhesion improvement layer 35B has a thickness of 50 nm.

As described above, the adhesion improvement layers 35A and 35B can be produced by electron beam evaporation or the like, for example.

The reflection stack 30 is provided with a sealing layer 37 which is formed to cover the back surface and peripheral side surfaces of the reflection layer 31.

An adhesion layer 38 for bonding the sealing layer 37 to the reflection stack 30 and the fluorescent plate 21 is provided between the reflection stack 30 and the sealing layer 37 and between a peripheral area of the back surface of the fluorescent plate 21 and the sealing layer 37. In other words, the adhesion layer 38 is provided in close contact with the peripheral side surfaces of the reflection layer 31, the back surface and the peripheral side surfaces of the adhesion improvement layer 35B, the peripheral area of the back surface of the fluorescent plate 21, and the sealing layer 37.

In such a manner, the sealing layer 37 is provided on the back surface of the fluorescent plate 21, in close contact with the reflection stack 30 via the adhesion layer 38. The sealing layer 37, the adhesion layer 38 and the fluorescent plate 21 form a sealing structure of the reflection stack 30.

In the illustrated example, the sealing layer 37 and the adhesion layer 38 are provided to cover the entire reflection stack 30. The adhesion layer 38 is in close contact with the entire peripheral side surfaces of the metal oxide multilayer film constituting the enhanced reflection portion 32.

A stress relaxation layer 41, which is made of a multilayer film including titanium (Ti) layers 41A and 41B and platinum (Pt) layers 42A and 42B, and a gold layer 43 are provided in such order on the back surface (in FIG. 2, bottom surface) of the sealing layer 37. The titanium layer 41A in contact with the sealing layer 37 has a thickness of 50 nm. The platinum layer 42A in contact with the titanium layer 41A has a thickness of 150 nm. The titanium layer 41B in contact with the platinum layer 42A has a thickness of 100 nm. The platinum layer 42B in contact with the titanium layer 41B has a thickness of 200 nm. The gold layer 43 has a thickness of 500 nm. The titanium layers 41A and 41B and the platinum layers 42A and 42B constituting the stress relaxation layer 41, and the gold layer 43 are each produced by sputter deposition. According to the stress relaxation layer 41 made of such a multilayer film, stress occurring in the sealing layer 37 can be relaxed because the coefficient of thermal expansion of titanium ($8.5 \times 10^{-6}$ [1/K]) and the coefficient of thermal expansion of platinum ($8.9 \times 10^{-6}$ [1/K]) are approximate to that of YAG ($8.6 \times 10^{-6}$ [1/K]) which is used as the constituent material of the fluorescent plate 21. The platinum layers 42A and 42B provide an anti-diffusion function against the metal (specifically, for example, tin) constituting the bonding member layer 26. In other words, the platinum layers 42A and 42B also function as anti-diffusion layers along with an anti-diffusion layer 45 to be described later.

The formation of the sealing structure of the reflection stack 30 prevents the exfoliation of the reflection layer 31 from the florescent plate 21 and gives the reflection layer 31 a high reflection function over a long period of time.

In particular, the sealing layer 37 is provided on the fluorescent plate 21, in which a metal oxide (specifically, aluminum oxide ($Al_2O_3$)) is exposed, via the adhesion layer 38. The adhesion between the adhesion layer 38 and the fluorescent plate 21 is thus higher than that between the fluorescent plate 21 and the reflection stack 30 (specifically, the silicon dioxide layer 32A of the enhanced reflection portion 32). This provides sufficient adhesion between the peripheral area of the back surface of the fluorescent plate 21 and the sealing layer 37 (adhesion layer 38).

The formation of the sealing structure of the reflection stack 30 can prevent exfoliation of the layers constituting the reflection stack 30. The reflection stack 30 can also be prevented from exposure to an operating environment atmosphere when the fluorescence light source apparatus 10 is in operation. The fluorescence emission member 20 thus has excellent weather resistance and moisture resistance. As a result, the exfoliation of the reflection layer 31 from the fluorescent plate 21 and the surface deterioration of the reflection layer 31 due to oxidation and sulfuration can be prevented.

Moreover, the firm adhesion between the fluorescent plate 21 and the adhesion layer 38 provides a structure in which the exfoliation or the like of the reflection layer 31 will not occur even if a 1- to 4-μm-thick anti-diffusion layer 45 is formed on the back surface side of the sealing layer 37.

In addition, the formation of the sealing structure of the reflection stack 30 can prevent the reflection stack 30 from exposure to a manufacturing environment atmosphere in the manufacturing steps of the fluorescence light source apparatus 10, like in the process of forming the fluorescence emission member 20 after the formation of the sealing structure of the reflection stack 30 and in the process of bonding the fluorescence emission member 20 to the heat dissipation substrate 22. The reflection stack 30 of the fluorescence light source apparatus 10 thus has an intended reflection function.

The sealing layer 37 is made of nickel or indium. From the viewpoint of weather resistance, the sealing layer 37 may preferably be made of nickel.

For example, the sealing layer 37 has a thickness smaller than or equal to 0.5 μm.

The sealing layer 37 is formed by sputter deposition or the like.

In the illustrated example, the sealing layer 37 is made of nickel. The sealing layer 37 has a thickness of 110 nm.

The adhesion layer 38 is made of chromium, a chromium alloy, titanium, or the like. In particular, from the viewpoint of adhesion to the sealing layer 37, the adhesion layer 38 may preferably be made of chromium if the sealing layer 37 is made of nickel.

For example, the adhesion layer 38 has a thickness of 50 nm both between the reflection stack 30 and the sealing layer 37 and between the fluorescent plate 21 and the sealing layer 37.

The adhesion layer 38 is formed by sputter deposition or the like.

In the illustrated example, the adhesion layer 38 is made of chromium. An area of the back surface of the fluorescent plate 21 where the adhesion layer 38 is in close contact, i.e., the peripheral area of the back surface of the fluorescent plate 21 has a reflection function because the adhesion layer 38 made of metal is provided in close contact. In other words, the back surface of the fluorescent plate 21 has a high reflection function in the center portion and a reflection function in the peripheral area. This reduces the absorption of fluorescence in the peripheral area of the back surface of the fluorescent plate 21. The fluorescence occurring in the fluorescent plate 21 can thus be efficiently extracted from the fluorescence emission member 20.

In the present embodiment, the adhesion layer 38 is described to be made of chromium. However, the adhesion layer 38 may be made of at least one of titanium, silicon, tantalum, aluminum and oxides thereof instead of chromium.

As illustrated in FIG. 2, the fluorescence emission member 20 may preferably include an anti-diffusion layer 45 which is provided on the back surface side of the sealing layer 37, or more specifically, between the sealing layer 37 and the bonding member layer 26.

From the viewpoint of an anti-diffusion function, the anti-diffusion layer 45 has a thickness of greater than or equal to 1 μm. From the viewpoint of exfoliation prevention of the reflection layer 31, the anti-diffusion layer 45 may preferably have a thickness of smaller than or equal to 4 μm.

In the illustrated example, a solder wet film layer 46 made of gold is provided between the anti-diffusion layer 45 and the bonding member layer 26.

The provision of the anti-diffusion layer 45 can prevent the metal (specifically, for example, tin) constituting the bonding member layer 26 from diffusing into the constituent members of the fluorescence emission member 20 stacked on the front surface (in FIGS. 1 and 2, top surface) of the anti-diffusion layer 45 even if the operating temperature of the fluorescence emission member 20 (fluorescent plate 21) reaches 200° C. to 250° C. (bonding portion temperature reaches 150° C. to 200° C.) when the fluorescence light source apparatus 10 is in operation. Such an effect is significant when the fluorescence light source apparatus 10 is driven under a driving condition that the back surface of the fluorescent plate 21 becomes high in temperature (specifically, 100° C. to 200° C.), or more specifically, under a driving condition that the excitation density of the excitation light on the fluorescent plate 21 is not lower than 20 to 200 W/mm$^2$.

The anti-diffusion layer 45 is made of copper (Cu), palladium (Pd), platinum (Pt), or nickel (Ni), and may preferably be made of nickel.

From the viewpoint of reducing the stress acting on the reflection layer 31 from the anti-diffusion layer 45 to prevent exfoliation of the reflection layer 31, the anti-diffusion layer 45 may preferably be formed by plating in a plating bath of high solubility. The anti-diffusion layer 45 may particularly preferably be formed by plating in a sulfamate bath.

In the fluorescence light source apparatus 10 having such a configuration, the front surface (excitation light incident surface) of the fluorescent plate 21 is irradiated with the excitation light emitted from the excitation light source 11, and the excitation light enters the fluorescent plate 21. In the fluorescent plate 21, the phosphor constituting the fluorescent plate 21 is excited. The phosphor thus emits fluorescence in the fluorescent plate 21. The fluorescence is emitted from the front surface (fluorescence emission surface) of the fluorescent plate 21 to outside and emitted out of the fluorescence light source apparatus 10 along with excitation light that is not absorbed by the phosphor and reflected from the reflection layer 31 on the back surface of the fluorescent plate 21.

In the fluorescence light source apparatus 10, the sealing structure of the reflection stack 30 is formed by the fluorescent plate 21, the sealing layer 37 and the adhesion layer 38. The reflection layer 31 is thereby brought into close contact with the fluorescent plate 21 via the adhesion improvement layer 35A and the enhanced reflection portion 32 on the back surface side of the fluorescent plate 21. In addition, the reflection stack 30 is not exposed to the ambient atmosphere such as the air. This can prevent a drop in the reflectance of the reflection layer 31 over time due to surface deterioration of the reflection layer 31 by oxidation, sulfuration and the like.

According to the fluorescence light source apparatus 10, a drop in reflectance can be prevented and high emission efficiency can thus be obtained over a long period of time without causing the problem of exfoliation of the reflection layer 31 from the fluorescent plate 21.

In the fluorescence light source apparatus 10, since the sealing layer 37 is made of nickel and the adhesion layer 38 is made of chromium, the sealing layer 37 has excellent weather resistance. Since the sealing layer 37 is brought into close contact with the fluorescent plate 21 and the reflection stack 30 more firmly by the action of the adhesion layer 38, the sealing structure of the reflection stack 30 has higher sealability. This further prevents a drop in the reflectance of the reflection layer 31 due to exfoliation from the fluorescent plate 21 and surface deterioration by oxidation, sulfuration and the like. As a result, the fluorescence light source apparatus 10 can provide high emission efficiency over a longer period of time.

In the fluorescence light source apparatus 10, the reflection layer 31 is made of a silver reflection film formed on the back surface side of the fluorescent plate 21 via the enhanced reflection portion 32 including the metal oxide multilayer film. The back surface of the fluorescent plate 21 thus has a superior high reflection function by virtue of the high reflection characteristic of the silver reflection film and the reflectance improvement characteristic of the enhanced reflection portion 32. In addition, the interposition of the adhesion improvement layer 35A made of aluminum oxide ($Al_2O_3$) between the reflection layer 31 and the enhanced reflection portion 32 provides high adhesion between the reflection layer 31 and the enhanced reflection portion 32.

Although the reflection layer 31 made of a silver reflection film has low adhesion and is prone to oxidation and sulfuration, the formation of the sealing structure of the reflection stack 30 prevents a drop in the reflectance of the reflection layer 31 due to exfoliation from the fluorescent plate 21 and surface deterioration by oxidation, sulfuration and the like.

Consequently, the fluorescence light source apparatus 10 in which the reflection layer 31 made of a silver reflection film is formed on the back surface side of the fluorescent plate 21 via the metal oxide multilayer film provides even higher emission efficiency over a long period of time.

The fluorescence light source apparatus according to the present invention has been described above by using a specific example. However, the fluorescence light source apparatus according to the present invention is not limited thereto.

For example, a periodic structure including a periodic array of a plurality of protrusions may be formed on the front surface of the fluorescent plate. For example, the periodic structure on the front surface of the fluorescent plate is a two-dimensional periodic array of closely packed protrusions having a substantially conical shape (specifically, a conical shape or a truncated conical shape) From the viewpoint of ease of manufacturing, if the fluorescent plate has a periodic structure on its front surface, the fluorescent plate may include a fluorescent member and a periodic structure layer that has optical transparency to the excitation light and the fluorescence.

The structure of the entire fluorescence light source apparatus is not limited to that illustrated in FIG. 1, and various configurations may be adopted. For example, while the fluorescence light source apparatus according to FIG. 1 uses the light of one excitation light source (for example, semiconductor laser), there may be a plurality of excitation light sources. A condenser lens may be disposed in front of the fluorescence emission member to irradiate the fluorescence emission member with the condensed light. The excitation light is not limited to the light of a semiconductor laser. Condensed light of an LED may be used as long as the phosphor in the fluorescent plate can be excited by the light. Even further, light from a lamp filled with mercury, xenon, or the like may be used. If a light source having a spread of radiation wavelengths, like a lamp and an LED, is used, the wavelength of the excitation light refers to a region of main radiation wavelengths. However, the present invention is not limited thereto.

REFERENCE SIGNS LIST

10 fluorescence light source apparatus
11 excitation light source
20 fluorescence emission member
21 fluorescent plate
22 heat dissipation substrate
23 protective film layer
24 solder wet film layer
26 bonding member layer
30 reflection stack
31 reflection layer
32 enhanced reflection portion
32A silicon dioxide layer
32B titanium oxide layer
35A, 35B adhesion improvement layer
37 sealing layer
38 adhesion layer
41 stress relaxation layer
41A, 41B titanium layer
42A, 42B platinum layer
43 gold layer
45 anti-diffusion layer
46 solder wet film layer
51 fluorescent plate
52 heat dissipation substrate
53 bonding member layer

The invention claimed is:

1. A reflection type fluorescence light source apparatus comprising:
   a fluorescent plate formed of a sintered body made of a mixture of a phosphor for emitting fluorescence under excitation light and a metal oxide and has a front surface serving as an excitation light incident surface;
   a reflection stack that includes a reflection layer disposed on a back surface side of the fluorescent plate; and
   a heat dissipation substrate, wherein
   a sealing structure of the reflection stack is formed by the fluorescent plate, a sealing layer covering a back surface and a peripheral side surface of the reflection layer, and an adhesion layer that bonds the sealing layer to the reflection stack and the fluorescent plate, the reflection layer is made of a silver reflection film, and a metal oxide multilayer film, forming an enhanced reflection portion, is provided between the reflection layer and the fluorescent plate in close contact with the back surface of the fluorescent plate.

2. The reflection type fluorescence light source apparatus according to claim 1, wherein the sealing layer is made of nickel or indium.

3. The reflection type fluorescence light source apparatus according to claim 1, wherein the adhesion layer is made of at least one selected from the group consisting of chromium, a chromium alloy, and titanium.

* * * * *